(12) United States Patent
Smith et al.

(10) Patent No.: US 7,127,533 B2
(45) Date of Patent: Oct. 24, 2006

(54) INTERRUPT DRIVEN EXPANDED OPTION SELECT INTERFACE FOR PORTABLE DEVICE

(75) Inventors: Sybren D. Smith, Plantation, FL (US); Joseph Patino, Pembroke Pines, FL (US)

(73) Assignee: Motorola, Inc., Schaumburg, IL (US)

( * ) Notice: Subject to any disclaimer, the term of this patent is extended or adjusted under 35 U.S.C. 154(b) by 48 days.

(21) Appl. No.: 10/742,250

(22) Filed: Dec. 19, 2003

(65) Prior Publication Data

US 2005/0138227 A1   Jun. 23, 2005

(51) Int. Cl.
*G06F 3/00* (2006.01)

(52) U.S. Cl. .............. 710/16; 710/8; 710/10; 710/11; 710/14; 455/66.1

(58) Field of Classification Search ........... 710/5–15; 455/66.1–67.7
See application file for complete search history.

(56) References Cited

U.S. PATENT DOCUMENTS

| | | | |
|---|---|---|---|
| 4,608,562 A * | 8/1986 | Minor et al. .......... | 340/825.59 |
| 5,301,360 A | 4/1994 | Goldberg | |
| 6,460,094 B1 * | 10/2002 | Hanson et al. .......... | 710/8 |
| 2002/0065964 A1 * | 5/2002 | Lemke et al. .......... | 710/48 |

OTHER PUBLICATIONS

The Microsoft Computer Dictionary, 2002, Microsoft Press, 5th edition, pp. 209,210,368, and 369.*

* cited by examiner

*Primary Examiner*—Kim Huynh
*Assistant Examiner*—Eron Sorrell
(74) *Attorney, Agent, or Firm*—Scott M. Garrett

(57) ABSTRACT

A peripheral component (104) is attached to a portable electronic device (102), and indicates an option class of the peripheral component by use of an option select circuit. The option select circuit causes an interrupt to be generated in the portable electronic device, which then determines the option class by changing the logic levels of various option select lines. If an inversion of the logic state of one of the option select lines is detected, then the portable electronic device knows an option select circuit is present, and determines the option class of the peripheral component accordingly.

14 Claims, 2 Drawing Sheets

INTERRUPT DRIVEN EXPANDED OPTION SELECT INTERFACE FOR PORTABLE DEVICE

TECHNICAL FIELD

This invention relates in general to portable electronic devices, and more particularly to interfaces on portable electronic devices for attaching peripheral devices to a portable electronic device.

BACKGROUND OF THE INVENTION

Portable electronic devices are in widespread use in everyday life throughout many regions of the world, and particularly in metropolitan regions. Examples of such devices include mobile communication devices, personal digital assistants and other handheld computer devices, cameras, and so on. Many of these devices are designed with an electrical interface that allows them to be used with accessory or peripheral devices such as external audio devices, cameras, wireless communication modules, for example. When a peripheral component is attached to the portable device, it is preferable that the portable device detect the presence of the peripheral component so that the portable device can instantiate appropriate driver software for operating the peripheral component. This presents two problems. First, how the presence of the peripheral component is detected, and second, determining which peripheral component is present so that the right driver software and operating mode may be initiated on the portable device.

Typically portable devices having external interface connectors provide power and a ground reference connection so that power may be provided to the peripheral device. Furthermore one or more option selector lines are provided so that the peripheral component or the class of the peripheral component may be determined. One method of detecting the presence of a peripheral component is for the peripheral component to load an option select line so as to bring it to a logical zero level, which is detected by the portable device, either by a periodic scan or by the logical zero causing an interrupt which, upon servicing, reveals the presence of the peripheral component. However, with this passive method of detecting the presence of the peripheral component, the number of peripheral components or classes of peripheral components is limited by the number of option select lines used. Given the cost sensitive market in which many portable devices are sold, it is preferable to minimize the size of external connectors, and thus minimize the number of option select lines used.

One method of expanding the number of peripheral components beyond what can be achieved using passive detection with option select lines is described in U.S. Pat. No. 5,301,360 to Goldberg, which teaches the use of diodes between option select lines. The portable device periodically scans the option select lines to determine if a peripheral component been attached to the portable device by applying different logical levels to the option select lines and observing other option select lines to determine the presence of the diode, its orientation, and whether it is a zener diode or normal diode. A jumper shorting the lines together may also be used. However, this arrangement requires the portable device to actively scan the option select lines since the presence of the diode will not change logic states which can be used to generate an interrupt. It is preferable to avoid the processing resources of periodically performing an active scan of the option select lines. Therefore there is a need for a means by which more peripheral components or peripheral component classes may be defined with a limited number of option select lines, and for such means to be passively detected by allowing an interrupt to be generated when a peripheral component is connected to the portable device.

DETAILED DESCRIPTION OF A PREFERRED EMBODIMENT

Figure 1:
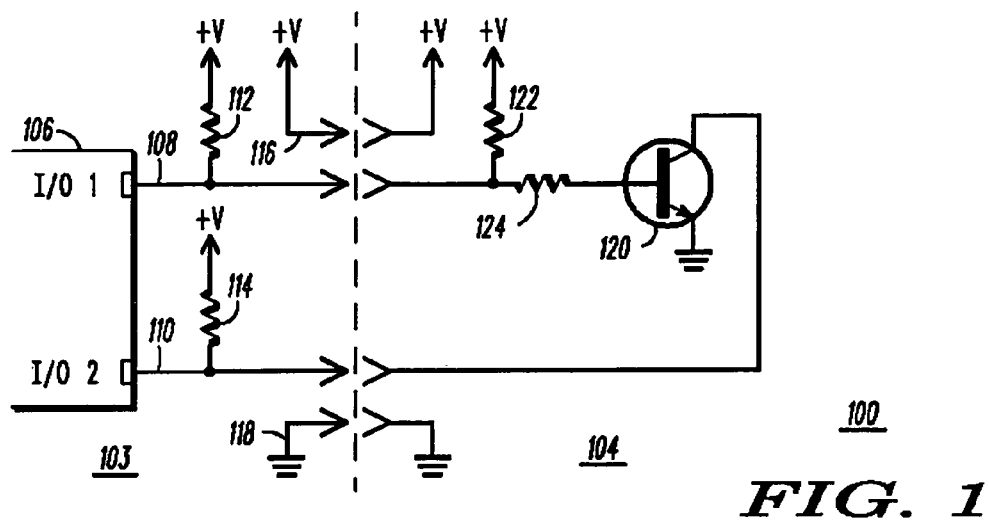
FIG. 1 shows a schematic diagram of a portable electronic device and a peripheral component having an option select circuit, and showing a first arrangement of an option select circuit.

While the specification concludes with claims defining the features of the invention that are regarded as novel, it is believed that the invention will be better understood from a consideration of the following description in conjunction with the drawing figures, in which like reference numerals are carried forward.

The invention solves the problem of allowing the presence of the peripheral component to be detected in response to an interrupt while not limiting the number of types of peripheral components by providing active elements between option select lines hat pull at least one of the option select lines to a logic level zero to generate the interrupt, and which invert the logic level of a first line when a second line is pulled to a logic level zero.

Referring now to FIG. 1, there is shown a schematic diagram 100 of a portable electronic device 102 and a peripheral component 104 having an option select circuit. The option select circuit shown here is a first arrangement or embodiment of the option select circuit. The junction of the portable electronic device and peripheral component is denoted by the vertical dashed line which represents an electrical interface such as an electrical connector. The portion of the portable electronic device shown is an input/output (I/O) port array 106. The I/O port array includes a plurality of I/O ports, such as a first I/O port 108 and a second I/O port 110. Each of the first I/O ports are coupled to an option select line of the electrical interface. The ports can be configured as inputs to read a logic level, and they can alternatively be configured as outputs to assert a logic level, the logic level being either a zero or a one. Each of the I/O ports is also coupled to an interrupt line internal to the portable electronic device. It is also contemplated that the inputs may further be configured as analog to digital (A/D) converter inputs if the portable electronic device is provided with an A/D converter. Each of the option select lines is pulled high with a high impedance resistor 112, 114, as is common. The interface provides a supply voltage 116 for power, and return or ground 118 to the peripheral component from the portable electronic device.

The peripheral component may include an option select circuit to indicate the type or class of the peripheral component. The option select circuit may be used with prior art means for indicting the presence and type of peripheral component which includes connecting one or more of the option select lines to ground. By including the option select circuit, the number of types or classes of peripheral components that can be used may be expanded over the prior art means. According to the invention the option select circuit comprises an active inverter element coupled between the first and second option select lines. The active inverter element causes at least one of the option select lines to be pulled low, which causes a logic level one to transition to a logic level zero. The first option select line is connected via first connector 126 and the second option select line is connected via second connector 128.

Figure 2:
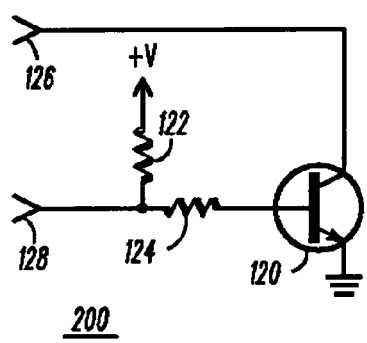
FIG. 2 shows a second arrangement of an option select circuit.

In a first embodiment the option select circuit comprises an transistor 120 having a control terminal, such as a base terminal of an NPN transistor or the gate terminal of an n-channel metallic oxide semiconductor field effect transistor (MOSFET), coupled to a pull up biasing resistor network 122, 124 on the first option select line, and first and second conducting terminals coupled between the second option select line and ground. The first and second conducting terminals may be, for example, the collector and emitter of an NPN transistor, or the source and drain of a MOSFET. By conducting terminals it is meant the terminals of the transistor through which current is conducted when operating as a switch in the "on" or conducting mode. For example, when an NPN transistor is switched on, current conducts from the collector to emitter. In this arrangement a pull up resistor 122 is coupled between the supply and an in put resistor 124. When the option select circuit shown in FIG. 1. is connected to the portable electronic device, the pull up resistor network 122, 124 sources current to the control input of the transistor from the supply, which switches it to conduct between the other terminals, causing the second option select line to be pulled to a logic level zero. When a logic level zero is applied to the first option select line, however, the transistor shuts off, causing the second option select line to transition to a logic level one by pull up resistor 114. FIG. 2 shows the same option select circuit as in FIG. 1, but in a second arrangement 200 with the active inverter element on the second option select line, and causing the first option select line to transition to a logic level zero upon first connecting the peripheral component to the portable electronic device.

Figure 3:
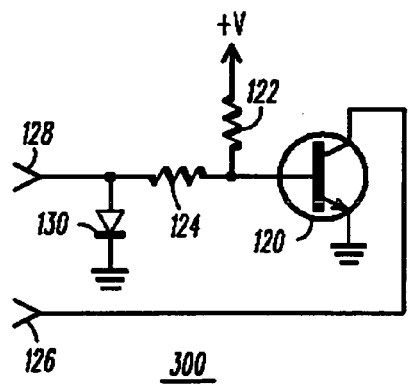
FIG. 3 shows a third arrangement of an option select circuit.
Figure 4:
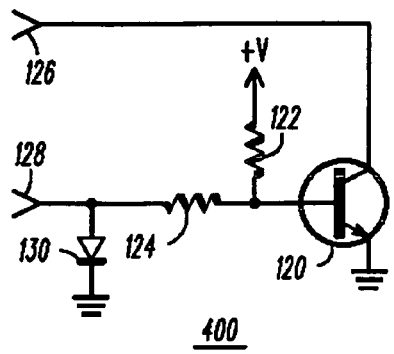
FIG. 4 shows a fourth arrangement of an option select circuit.

Referring now to FIGS. 3–4, there is shown a third arrangement 300 and a fourth arrangement 400, respectively, of an option select circuit. In these embodiments both option select lines will be pulled low, causing them to transition from a logic level one to a logic level zero. A diode 130 is added in front of the pull up resistor network 122, 124. The pull up resistor network is also rearranged here so that pull up resistor 122 is couple directly between the control input of the transistor and the supply. The isolation resistor 124 is coupled between the control input and the point on the option select line where the diode is connected between the option select line and ground. The diode is connected so as to pull the option select line low because the voltage across the diode will be read as a logic level zero by the I/O port when configured as an input. Voltage and/or current are sourced to the transistor through pull up resistor 122 as before, causing the transistor to conduct, which results in the second option select line being pulled low and transitioning from a logic level one to a logic level zero at I/O port. The isolation resistor 124 prevent the diode from shutting off the transistor due to the voltage drop across the resistor, which is typically 0.7 volts. However, when a logic level zero is asserted on the first option select line via 126, the voltage on the first option select line drops enough that the isolation resistor cannot prevent the transistor from shutting off, which causes the second option select line to transition from a logic level zero to a logic level one. FIG. 4 shows the same option select circuit as in FIG. 3 but on a different option select line.

Figure 5:
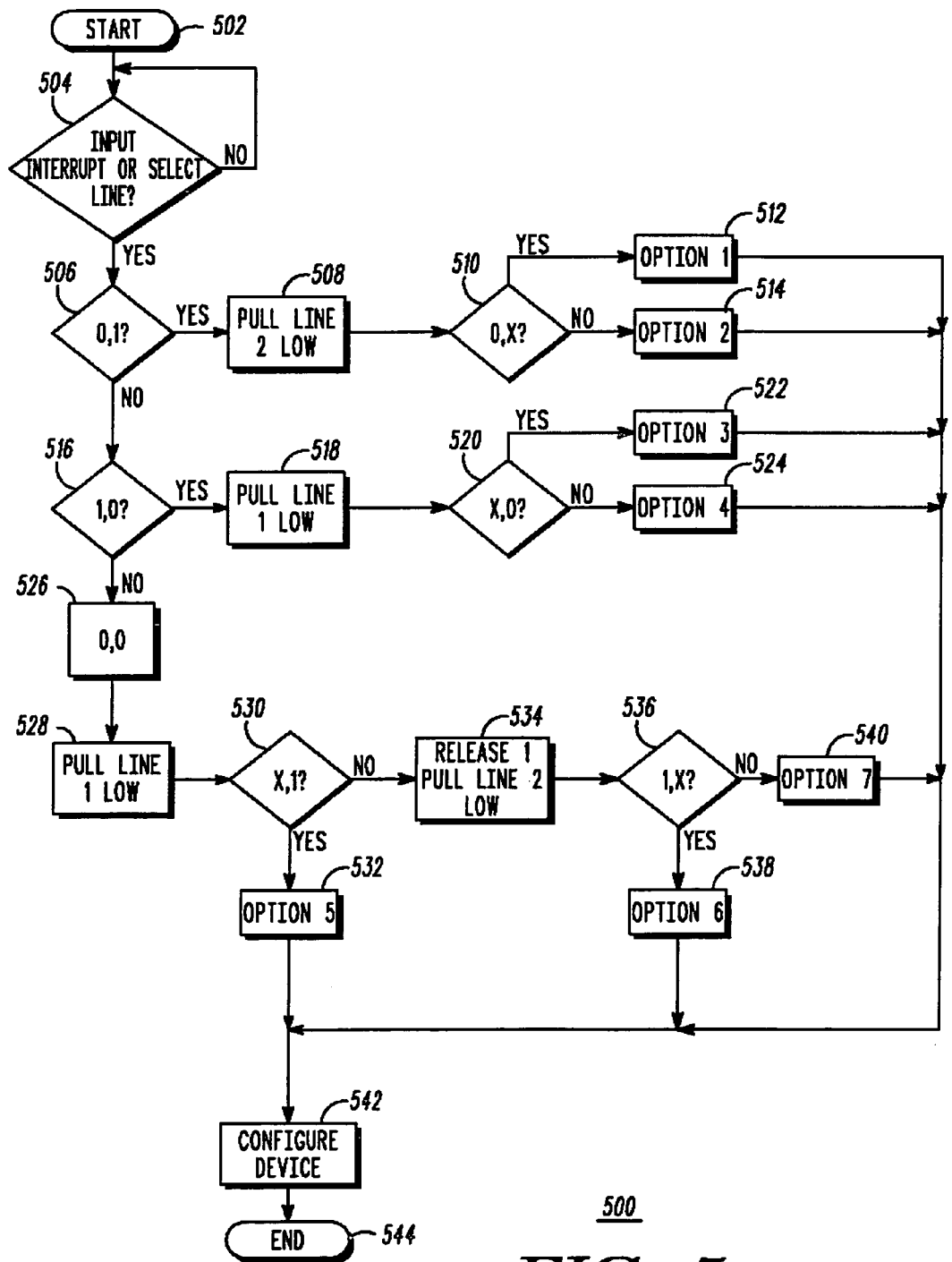
FIG. 5 shows a flow chart diagram of a method of detecting and indicating the presence and type of peripheral component attached to a portable electronic device.

Referring now to FIG. 5, there is shown a flow chart diagram 500 of a method of detecting and indicating the presence and type of peripheral component attached to a portable electronic device. At the start of the process the portable electronic device and peripheral component are not initially connected, and the I/O ports of the portable electronic device are configured as inputs. Once the two devices are connected, the process starts. In the preferred embodiment, the portable electronic devices waits until an interrupt is generated (504). Upon the detection of the interrupt, the portable electronic device reads the I/O ports to determine the logic states of the option select lines. There are three cases that may occur; 01, 10, and 00. If the 01 case occurs (506), the portable electronic device asserts a logic level zero on the second option select line (508). If the first option select line doesn't change, then a prior art configuration is being used in the peripheral component with the first option select line being grounded, and so a first option class is determined (512). If the first option select line transitions (510), then an inverter in accordance with the invention as shown in FIG. 1 is being used and a second option class is determined (514).

In the case of the I/O ports being in the 10 (one, zero) state, the portable electronic device asserts a logic zero on the first option select line (518). If the second option select line doesn't change, then the peripheral component is using the prior art option select means of grounding the second option select line, and a third option class is determined (522). If the second option select line changes from a logic one to a logic zero (520), then an inverter in accordance with the invention is used in accordance with FIG. 2 to indicate a fourth option class (524).

If both I/O ports are at logic zero (526) then the portable electronic device asserts a logic zero on the first option select line. If the second option select line transitions from a zero to a one (530), then an inverter in accordance with FIG. 3 is being used to indicate a fifth option class (532). If the second option select line remains at a zero level (530), the first option select line is released by configuring the first I/O port as an input, and then the second I/O port is configured as an output and a logic zero is asserted on the second option select line (534). If the first option select line transitions from a zero to a one, the an inverter in accordance with FIG. 4. is being used to indicate a sixth option class (538). If the first option select line doesn't change (536), then a prior art method of grounding both option select lines is being used to indicate a seventh option class (540).

Thus the invention allows an expansion of the number of option classes that may be indicated over the prior art method of grounding one or more option select lines to generate an interrupt and indicate to which option class the peripheral component belongs. Using a two line option select interface, the invention allows seven option classes to be defined over just 3 using the prior art method. The invention provides an option select circuit for use in a peripheral component to be connected to a portable electronic device at a connector, where the connector provides a supply and a ground to the peripheral component. The option select circuit comprises first and second option select lines with an active inverter element disposed between the first and second option select lines. The active inverter element causes at least one of the first and second option select lines to be at a logic level zero when the peripheral component is connected to the portable electronic device. The active inverter may include a transistor having a control terminal coupled to a pull up biasing resistor network on the first option select line, and first and second conducting terminals coupled between the second option select line and ground. The transistor may be an NPN or a n-channel MOSFET. In an alternative embodiment the option select circuit comprises a diode coupled between the first option select line and ground, in addition to a transistor having a control terminal coupled to a pull up biasing resistor network on the first option select line and first and second conducting terminals coupled between the second option select line and ground. In this embodiment an isolation resistor is coupled between the control terminal of the transistor and diode. The diode is configured to force the first option select line to a logic level zero upon connection of the peripheral component to the portable electronic device. As state here, the first and second option select lines may be reversed to indicate a different option class.

The invention also provides for a method of detecting the presence and type of a peripheral component attached to a portable electronic device. The method includes providing a supply voltage and a ground to the peripheral device upon connection of the peripheral component to the portable electronic device, and detecting a transition from a logic level one to a logic level zero on at least one of a first option select line and a second option select line. After detecting the transition, the portable electronic device then commences determining an option class of the peripheral component by applying a logic level zero to at least one of the first option select line and the second option select line. In the preferred embodiment, the transition from a logic level one to a logic level zero on the first option select line or the second option select line generates an interrupt in the portable electronic device. The transition is detected by the occurrence and servicing of the interrupt. The transition may occur on one, or on both option select lines. If the transition occurs only on one line, then the other line is pulled low and the transitioning line is observed to determine if it changes logic level to determine the option class.

Similarly, the method provides in a peripheral component a method of indicating the presence and type of the peripheral component by receiving a supply voltage and a ground from the portable electronic device upon connection of the two. The presence of the supply and ground cause a transition from a logic level one to a logic level zero on at least one of the first option select line or the second option select line. In response to one of the first or second option select lines having a logic level zero applied to it by the portable electronic device, an option select circuit commences inverting a logic level of the other option select line.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims. For example, one skilled in the art will realize that more than two option select lines may be used. In such a case where more than two option select lines are used, however, there will still be a first and a second option select line between which an option select circuit is disposed. It matters not how the lines are counted.

What is claimed is:

1. An option select circuit for use in a peripheral component to be connected to a portable electronic device at a connector, the connector providing a supply and a ground to the peripheral component, the option select circuit comprising:
   first and second option select lines;
   an active inverter element disposed between the first and second option select lines, the active inverter element causing at least one of the first and second option select lines to be at a logic level zero when the peripheral component is connected to the portable electronic device, wherein the first option select line and the second option select line are included in an electrical interface between the peripheral component and the portable electronic device.

2. An option select circuit as defined in claim 1 wherein the active inverter element is a transistor having a control terminal coupled to a pull up biasing resistor network on the first option select line and first and second conducting terminals coupled between the second option select line and ground.

3. An option select circuit as defined in claim 2, wherein the transistor is an NPN transistor.

4. An option select circuit as defined in claim 2, wherein the transistor is a n-channel MOSFET.

5. An option select circuit as defined in claim 1 wherein the active inverter element comprises:
   a diode coupled between the first option select line and ground;
   a transistor having a control terminal coupled to a pull up biasing resistor network on the first option select line and first and second conducting terminals coupled between the second option select line and ground; and
   an isolation resistor coupled between the control terminal of the transistor and diode;
   wherein the diode is configured to force the first option select line to a logic level zero upon connection of the peripheral component to the portable electronic device.

6. An option select circuit as defined in claim 5, wherein the transistor is an NPN transistor.

7. An option select circuit as defined in claim 5, wherein the transistor is a n-channel MOSFET.

8. A method of detecting the presence and type of a peripheral component attached to a portable electronic device, comprising:
   connecting the peripheral component to the portable electronic device;
   providing a supply voltage and a ground to the peripheral component in response to connecting the peripheral component to the portable electronic device;
   detecting a transition from a logic level one to a logic level zero on at least one of a first option select line and a second option select line, wherein the transition from a logic level one to a logic level zero on at least one of the first option select line and the second option select line is due to an active inverter element coupled between the first option select line and the second option select line in the peripheral component, and wherein the first option select line and the second option select line are included in an electrical interface between the peripheral component and the portable electronic device;
   determining an option class of the peripheral component by applying a logic level zero to at least one of the first option select line and the second option select line.

9. A method of detecting the presence and type of a peripheral component as defined in claim 8, wherein the transition from a logic level one to a logic level zero on at least one of the first option select line and the second option select line generates an interrupt in the portable electronic device, detecting the transition from a logic level one to a logic level zero on the first option select line comprises servicing the interrupt.

10. A method of detecting the presence and type of a peripheral component as defined in claim 8, wherein detecting the transition from a logic level one to a logic level zero on at least one of the first option select line and the second option select line comprises detecting a transition from a logic level one to a logic level zero on both the first option select and the second option select line.

11. A method of detecting the presence and type of a peripheral component as defined in claim 8, wherein;
   detecting the transition from a logic level one to a logic level zero on at least one of the first option select line and the second option select line comprises detecting the transition from a logic level one to a logic level zero on only the first option select line;
   determining the option class comprises applying the logic level zero to the second option select line and observing whether the first option select line remains at a logic level zero.

12. A method of indicating the presence and type of a peripheral component attached to a portable electronic device, comprising:
   connecting the peripheral component to the portable electronic device;
   receiving a supply voltage and a ground from the portable electronic device;
   causing a transition from a logic level one to a logic level zero on at least one of a first option select line and a second option select line, performed by an active inverter element coupled between the first option select line and the second option select line, wherein the first option select line and the second option select line are included in an electrical interface between the peripheral component and the portable electronic device;
   in response to one of the first option select line and second option select line having a logic level zero applied to it by the portable electronic device, inverting a logic level of the other of the first option select line and second option select line, performed by the active inverter element coupled between the first option select line and the second option select line.

13. A method of indicating the presence and type of a peripheral component as defined in claim 12, wherein causing the transition from a logic level one to a logic level zero on at least one of a first option select line and a second option select line comprises causing both the first option select line and second option select line to transition from a logic level one to a logic level zero.

14. A method of indicating the presence and type of a peripheral component as defined in claim 12, wherein;
   causing the transition from a logic level one to a logic level zero on at least one of the first option select line and the second option select line comprises causing the transition from a logic level one to a logic level zero on only the first option select line;
   inverting the logic level inverting the logic level zero of the second option select line.

* * * * *